United States Patent [19]

Sloan et al.

[11] Patent Number: 5,146,067

[45] Date of Patent: Sep. 8, 1992

[54] PREPAYMENT METERING SYSTEM USING ENCODED PURCHASE CARDS FROM MULTIPLE LOCATIONS

[75] Inventors: Joseph W. Sloan, Nashville; Harry P. Snyder, Brentwood; Joseph W. Foster; Mark C. Day, both of Nashville; Timothy G. Berg; Michael Jarreau, both of Brentwood; Mark P. Miller; A. Michael Bush, both of Nashville, all of Tenn.

[73] Assignee: CIC Systems, Inc., Brentwood, Tenn.

[21] Appl. No.: 464,328

[22] Filed: Jan. 12, 1990

[51] Int. Cl.⁵ .............................................. G06F 7/08
[52] U.S. Cl. ................................. 235/381; 235/449; 364/464.04; 340/825.35
[58] Field of Search ...................... 235/381, 380, 449; 364/464.04; 340/825.35, 825.33

[56] References Cited

U.S. PATENT DOCUMENTS

| | | |
|---|---|---|
| 2,019,866 | 11/1935 | Morton . |
| 3,001,846 | 9/1961 | Franceschini . |
| 3,380,064 | 4/1968 | Norris et al. . |
| 3,560,715 | 2/1971 | Akamatsu . |
| 3,676,875 | 7/1972 | Adams et al. . |
| 3,778,637 | 12/1973 | Arita . |
| 3,835,301 | 9/1974 | Barney . |
| 3,885,130 | 5/1975 | Moulton et al. . |
| 3,935,933 | 2/1976 | Tanaka et al. . |
| 4,019,135 | 4/1977 | Lofdahl . |
| 4,020,325 | 4/1977 | Pfost et al. . |
| 4,024,379 | 5/1977 | Pfost et al. . |
| 4,077,061 | 2/1978 | Johnston et al. . |
| 4,162,530 | 7/1979 | Kusui et al. . |
| 4,240,030 | 12/1980 | Bateman et al. . |
| 4,291,375 | 9/1981 | Wolf . |
| 4,345,311 | 8/1982 | Fielden . |
| 4,351,028 | 9/1982 | Peddie et al. . |
| 4,399,510 | 8/1983 | Hicks . |
| 4,442,492 | 4/1984 | Karlsson et al. . |
| 4,542,469 | 9/1985 | Brandyberry et al. . |
| 4,568,934 | 2/1986 | Allgood . |
| 4,575,622 | 3/1986 | Pellegrini . |
| 4,629,874 | 12/1986 | Pugsley et al. . |
| 4,731,575 | 3/1988 | Sloan . |
| 4,777,354 | 10/1988 | Thomas ............................... 235/380 |
| 4,795,892 | 1/1989 | Gilmore et al. ..................... 235/381 |
| 4,803,632 | 2/1989 | Frew et al. . |
| 4,906,828 | 3/1990 | Halpern ........................ 235/380 X |

FOREIGN PATENT DOCUMENTS

2188467 9/1987 United Kingdom .
2208955 4/1989 United Kingdom .

*Primary Examiner*—David Trafton
*Attorney, Agent, or Firm*—Merchant, Gould, Smith, Edell, Welter & Schmidt

[57] ABSTRACT

A prepayment system for dispensing utilities using mag-stripe cards is disclosed wherein an accounting computer in a central office is used in conjunction with point-of-sale machines for encrypting a value message which is written onto the mag-stripe of a mag-stripe card. The value message contains information relating to the amount of utilities purchased by the customer, the utility rates, the site identification number, and a unique password formed by the site number, a hidden number, and the transaction number. The mag-stripe card is carried by mail or in person to the consumer's home or office and inserted into a mag-stripe card reader attached to microprocessor-based utility control device. This utility control device is capable of reading and decoding the mag-stripe card and storing the value information into memory for use in monitoring the utility usage of the customer and disconnecting or connecting the utility based on the amount of utilities purchased.

8 Claims, 5 Drawing Sheets

| ACCOUNT NUMBER | —700 |
| --- | --- |
| STREET OR APARTMENT ADDRESS | —701 |
| COMMUNICATIONS PROTOCOLS TO BE USED | —702 |
| APPLICABLE ELECTRIC RATES | —703 |
| PASSWORD ROOT | —704 |

FIG. 4

| DATA OF NEXT RATE CHANGE | —705 |
| --- | --- |
| DATE OF TERMINATION OF COLD WEATHER PROTECTION | —706 |
| MAXIMUM ELECTRICAL LOAD ALLOWED UNDER COLD WEATHER PROTECTION | —707 |
| COMMUNICATIONS PROTOCOLS | —708 |
| ACCOUNT NUMBER | —709 |
| APPLICABLE RATES, AND WHETHER PRESENT OR FUTURE | —710 |
| PASSWORD ROOT | —711 |
| PASSWORD SUFFIX | —712 |
| AMOUNT OF PURCHASE | —713 |
| TODAY'S DATE | —714 |

FIG. 5

| ACCOUNT NUMBER | 715 |
| --- | --- |
| PASSWORD ROOT USED | 716 |
| PASSWORD SUFFIX USED | 717 |
| AMOUNT OF PURCHASE | 718 |
| DATE AND TIME OF THE TRANSACTION | 719 |
| BATCH NUMBER | 720 |

FIG. 6

| ACCOUNT (LOCATION) NUMBER | 721 |
| --- | --- |
| STREET NUMBER AND NAME OR APARTMENT NUMBER | 722 |
| COMMUNICATIONS PROTOCOLS | 723 |
| APPLICABLE RATES | 724 |
| PASSWORD 1 ROOT | 725 |
| PASSWORD 2 ROOT | 726 |

FIG. 7

| ACCOUNT NUMBER | 727 |
| --- | --- |
| PASSWORD ROOT USED | 728 |
| PASSWORD SUFFIX | 729 |
| AMOUNT OF PURCHASE | 730 |
| DATE AND TIME OF TRANSACTION | 731 |
| BATCH NUMBER | 732 |

FIG. 8

PREPAYMENT METERING SYSTEM USING ENCODED PURCHASE CARDS FROM MULTIPLE LOCATIONS

FIELD OF THE INVENTION

This invention relates to prepayment utility meter units, and more particularly to a more secure method and apparatus for providing prepayment information from more than one utility sales location to the customer site such that the messages are not subject to alternation, counterfeiting or fraud.

BACKGROUND OF THE INVENTION

Utility companies have historically used the method of reading meters and rendering bills as a means for collecting for electric, gas, and water service after it has been used by the customer. More recently, prepayment metering systems have been proposed in the prior art as a technology for overcoming some of the shortcomings of the traditional billing system. These prepayment systems were designed so that the purchase of a supply of electricity, gas, or water is made at a central station such as the gas or electric utility office, and the information regarding the amount of the purchase is then communicated to the customer site where the utilities are consumed. At the customer site a metering device is installed which is designed to receive the prepayment communication information and credit the user with the amount purchased at the central site. These types of proposed prepayment metering systems will reduce the overall cost of utility distribution by reducing or eliminating meter reading expenses, bad debt collection, account transfer expenses and credit department expenses, while at the same time providing a greater awareness on the consumer's part as to his or her consumption habits.

An example of a prior art utility company device of the aforementioned type is described in U.S. Pat. No. 4,731,575 to Joseph W. Sloan, which describes a microprocessor-controlled utility device which receives payment information on a mag-stripe card and allows the utility service to continue so long as the pre-purchased amount has not been exhausted. This device includes a display that the customer can use to monitor the utility usage at the customer site, including present rate of use, amount used the previous day, and the amount remaining.

One characteristic inherent in the prepayment for utility service is the possibility of service being interrupted because of a failure of the customer to make a timely purchase before the supply is exhausted. Therefore, in order for a prepayment system to be generally acceptable to the majority of customers, it is necessary that the customer be able to make additional purchases at any time of the day or night from one or more convenient stations located nearby. These remote purchase stations may be attended or unattended, but are most cost-effective if unattended.

A primary concern of prepayment metering systems is a communications method which cannot be breached by unauthorized personnel for the purpose of obtaining or continuing the utility service without proper payment. An example of an effective prior art communications security method is the sequential password described in the aforementioned U.S. Pat. No. 4,731,575. However, that system does not provide the flexibility and customer convenience required for operating large numbers of card purchase stations serving very large numbers of utility customers over a wide geographic area.

Another concern of prepayment is the opportunity for the customer to pre-purchase a very large quantity of utility service at the present lower rate prior to an announced increase in rates in order to continue to use service for an extended period of time at the lower rate. Furthermore, with the elimination of monthly meter reading, the opportunity for utility personnel to observe possible tampering or meter failure is greatly reduced.

The present invention overcomes these and other shortcomings of the prior art utility prepayment systems by providing a simple, low-cost communications and control system based primarily on existing and off-the-shelf components and by expanding the sequential password scheme such that the customer premise equipment will recognize and accept value and other information encoded on cards issued from several different purchase locations. The present invention uses an encoding scheme and relies on other mechanical and monitoring devices to bolster the overall security and reliability of the system.

SUMMARY OF THE INVENTION

According to the present invention there is provided a prepayment system for dispensing utilities using mag-stripe cards. A sales and accounting computer in the office is used in conjunction with point-of-sale machines for encrypting a value message which is written onto the mag-stripe of a mag-stripe card. The value message contains information relating to the amount of utilities purchased by the customer, the utility rates, the site identification number, and a unique password formed by the site number, a hidden number, and the transaction number. The mag-stripe card is carried by mail or in person to the consumer's home or office and inserted into a mag-stripe card reader attached to microprocessor-based utility control device. This utility control device is capable of reading and decoding the mag-stripe card and storing the value information into memory for use in monitoring the utility usage of the customer and disconnecting or connecting the utility based on the amount of utilities purchased.

The present invention provides a method and apparatus for the customer to purchase the mag-stripe value cards directly from the utility office by either mail order, in person or pre-arranged periodic bank drafts, or from unattended machines in convenient neighborhood locations which are accessible to the customer 24 hours per day. These unattended machines will recognize and accept local paper currency in common denominations, and provide a properly encoded card to the customer. The customer may use a previously used mag-stripe card to identify the location for which the utility is being purchased, or the location number may be entered by the customer by pressing numbered keys provided on the machine. It is not necessary to have a previously purchased card in order to make a purchase, since a supply of blank cards is available at the unattended machine. Two cards may be purchased at one time so that one may be kept in reserve for use in an emergency. The sequential password scheme provided by this invention allows any such reserve card to be used at any time, without regard to the sequence, and without any compromise of communications security.

BRIEF DESCRIPTION OF THE DRAWINGS

The invention will be described in more detail by way of example with reference to the accompanying drawings in which like numerals refer to like components throughout the several views:

FIG. 4 describes its structure of the New Account Records transmitted to the encoding machines;

FIG. 5 describes the structure of the message encoded on a mag-stripe card;

FIG. 6 describes the structure of the Transaction Records communicated to the central Accounting Computer;

FIG. 7 describes the structure of the Location Records maintained by the encoding machines; and FIG. 8 describes the structure of the Transaction Records maintained in the encoding machine;

DETAILED DESCRIPTION OF THE PREFERRED EMBODIMENT

Figure 1:
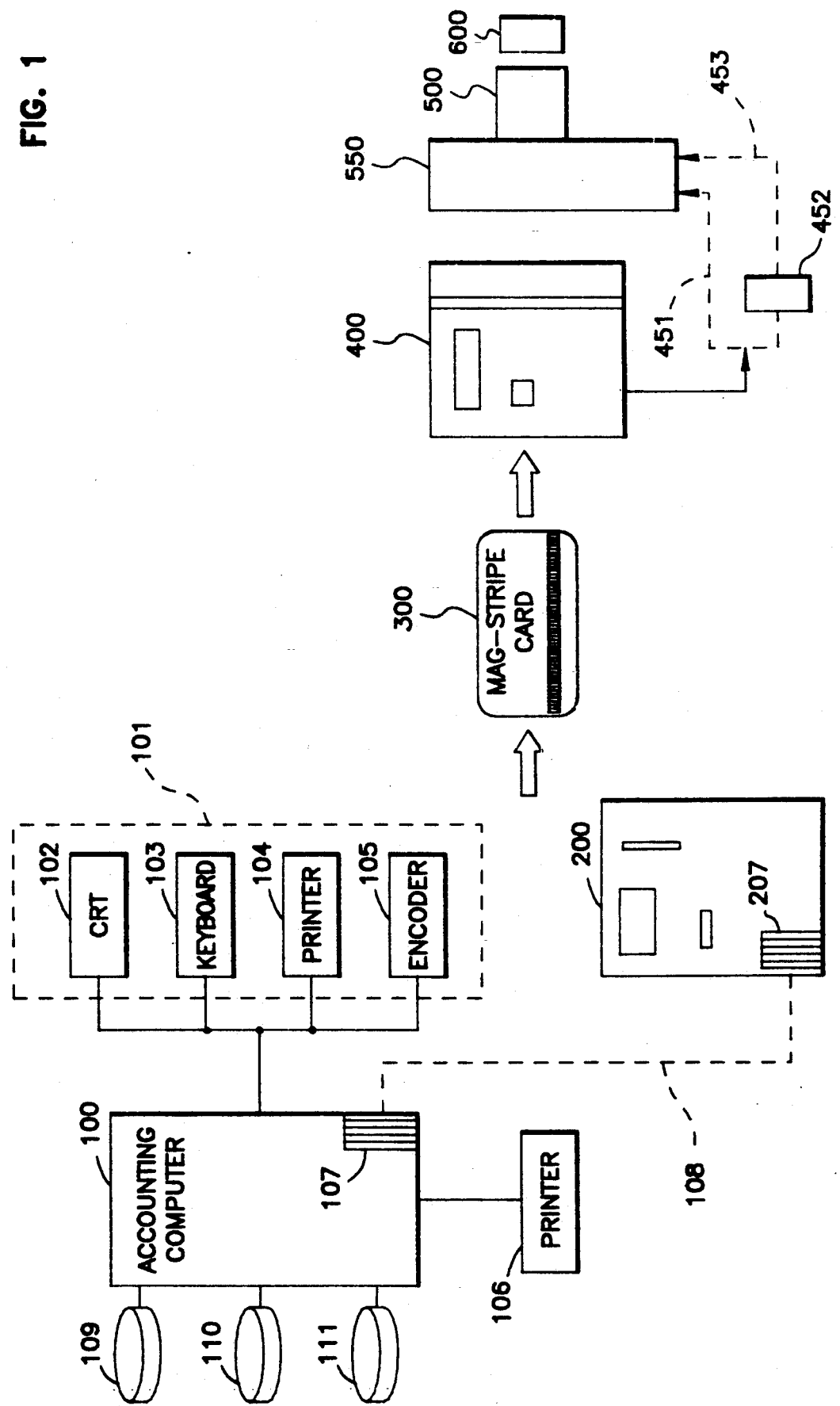
FIG. 1 is a pictorial diagram showing the main components in the prepayment system.

In the preferred embodiment of the present invention, a conventional off-the-shelf induction disc electric utility meter 600 is attached to a utility meter extension sleeve 500 or other housing, also commonly available as an off-the-shelf device, which incorporates an integral power disconnect switch 503. The utility meter 500 is designed with integral photoelectric cells 601 to measure shaft revolutions of the meter disk 602. The disconnect switch 503 is mechanically latching and of a capacity to match the service entrance size (typically 200 amps), which can be remotely controlled by the indoor display 400 and control sleeve 500. This indoor display box 400 is attached inside the customer premises and connects to the control sleeve 500 at the meter socket extension sleeve and the kWh utility meter 600 by means of a small 4-conductor cable 451, or alternatively by using the house wiring 453 as a powerline carrier. The indoor display box 400 includes a mag-stripe card reader 405 and a microprocessor-controlled system to provide for status display 403 and system control.

The mag-stripe cards 300 are used to convey encoded and encrypted value and account information to the customer's premises using ANSI standard mag-stripe type credit cards. These cards are encoded at the utility site or at any one of any attended or un-attended card dispensing stations 200 with a commonly available mag-stripe card writer which communicates as necessary with an Accounting Computer 100 which records the customer purchases and encrypts the next card image to be used. The Accounting Computer 100 and the indoor display 400 and control sleeve 500 at the customer site are both programmed with identical encryption and decryption algorithms to provide for a secure method of transferring information. The mag-stripe card 300 is encoded with a minimum amount of necessary information for conveying said value information, which includes a sequential password system known only to the transmitting and receiving stations so that value mag-stripe cards cannot be reused, and lost or stolen mag-stripe cards may be replaced with duplicate cards without fear of fraud. The sequential passwords are derived as a combination of the user account number, customer site ID, sequence number of the transaction, and the number of the encoding station 200. This information can be encoded into a password using a variety of mathematical algorithms and truncated into a unique non-repeating password. The password root for each account is provided by the Accounting Computer 100 as a part of a card image provided to each encoding dispensing machine 200 in the designated geographic area. At the time a card purchase is made, a unique password suffix and the value of the purchase are added by the computer at the card encoding station 200. The Accounting Computer 100 communicates at least once each day with all card encoding machines 200 to collect information regarding purchases, update the utility company's files, and provide new card images to the encoding machines 200 for those accounts where card purchases were made that day. In the preferred embodiment, each encoding machine 200 will carry card images for the next two transactions for each customer account, so that a customer may make two purchases the same day from the same encoding machine 200.

The customer indoor display 400 is programmed such that it will accept cards from any of several card encoding machines 200 (typically up to 7). The encoding machines to be used by a specific customer display 400 are not preprogrammed when the display 400 is installed, but are established by the customer's buying patterns. Each time the display 400 recognizes the customer has bought a mag-stripe card from a new and previously unused encoding machine 200, the display 400 will open a new series of passwords for future interaction with that encoding machine. The display 400 will generate the next three sequential passwords it should look for from that encoding machine 200. Then, each time one of those passwords is used, it will generate and store the next password which should appear in that sequence. Thus it is possible, in the preferred embodiment, for the display 400 to have up to 21 active passwords which it will accept (three from each of 7 dispensing machines 200). This scheme allows any regular value card 300 to be kept indefinitely for use as a reserve card for emergencies, regardless of when or where it was purchased, and when it is used.

This technique for the encoding and encrypting of value password information is simple and economical to implement, but highly effective in its security since the environment in which this system is to be used is already secured with tamper indicating tabs which are periodically checked for tampering. In addition, since conventionally available utility meters 600 are used in this application, the mechanical dials indicating utility usage are still in place, and can be periodically read by a service person from the utility company to verify the account information on record at the utility site.

Nevertheless, it is desirable for the utility company to become aware of any meter tampering event as quickly as possible so that corrective action can be taken. To this end, the control sleeve 500 contains means of detecting removal of the meter, the presence of a magnetic field, and disk rotation time intervals not proportional to the current being used. When any of these tampering events are detected, the indoor display 400 will cease to function in its normal manner, and the status display window 403 will show only a numbered error code which will identify the type of tamper event which occurred. This change of operating mode will not occur immediately, but at some number of hours following the event so that the customer will not necessarily attribute the error code to this tampering activity. It is expected that in most case, this apparent malfunction will be reported to the utility so that proper functionality will be restored.

It is also desirable that any malfunction of the display 400 or sleeve 500 be reported to the utility company as quickly as possible. Therefore, internal diagnostics programs will identify various component failures, such as the failure of a photo cell 601 that senses rotation of the meter disk 602, and the appropriate error code will be shown in the display window 403, to the exclusion of all other information. Again, it is assumed that if the customer can no longer read the amount remaining or other normal displays, he will report the malfunction to the utility company.

The prepayment metering system is shown in a pictorial block diagram in FIG. 1. Accounting Computer 100 is the "host controller" at the utility company office. If the system contains only one card encoding station 101, the Accounting Computer 100 may be a Personal Computer with the mag-stripe card encoder 105 attached directly to a serial port and operate substantially in the manner as described in the aforementioned prior art. If more than one card encoding stations 101 and/or 200 are used, Accounting Computer 100 will be a network file server, in which case it has the capability of serving a large number of on-line manned card-encoding stations consisting of a card encoder 105, CRT 102, keyboard 103, and dot matrix printer 104, and a large number of unmanned card dispensing machines 200 which may be located off the utility company premises. These remote, unmanned machines 200 are shown in the diagram as being interrogated periodically by dial-up telephone modems 108 on a periodic basis, but this communication may also be accomplished by a physical exchange of data diskettes.

The Accounting Computer 101 includes a library of all the screen images and instructions in such form and design that it is replicated in different languages. In a bilingual community such as Miami or Quebec, instructions on the CRT screen 102 may be presented in Spanish or French or English at the option of the operator, and may be keyed to each operator's access password such that the preferred language appears automatically for each operator. Other languages, such as Japanese and Korean, may be included in the library to the extent that they are already available in the PC environment. The number of languages which can be accommodated in the preferred embodiment is 16, but this can be expanded with additional memory if desired.

Figure 2:
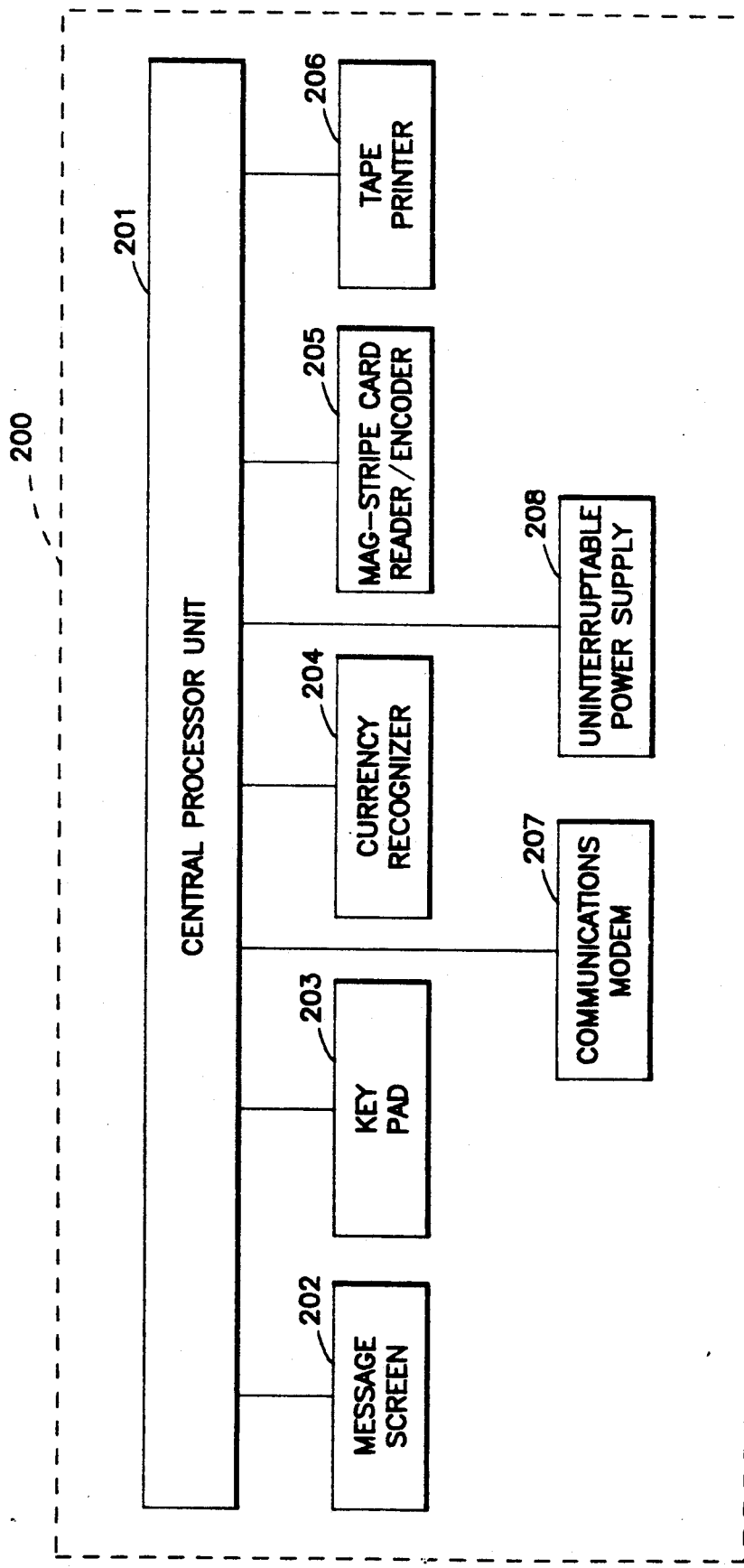
FIG. 2 is a block diagram of the un-attended mag-stripe card dispensing machine, which may be located on a counter of a business establishment or mounted in a wall.

FIG. 2 shows a block diagram of the unattended encoding machine 200. Except for the housing, it is assembled from commercially available components to perform remote, unattended point-of-sale card encoding functions and other procedures in accordance with a unique program encoded into its central processing unit 201; a CRT or LCD type message screen 202 to provide interactive instructions to the customer; a key pad 203 with numbers 0 through 9 and additional dedicated keys, all such keys being presented as physical buttons or as images on a touch-screen CRT; a currency-recognizing device 204 which will capture and read the value of inserted currency of commonly-used denomination; a mag-stripe card reader and encoder 205, either motor driven or a swipe type, which may or may not have the capability to print the date, amount of purchase, and other identifying information directly on the mag-stripe card; a tape printer 206 to print receipts for customers and/or print batch history for the clerk or agent responsible for administering the encoding machine's 200 operation; a communications modem 207 which can receive and initiate data transmission over commercial telephone lines or other suitable media; and an uninterruptible power supply 208.

The encoding machine 200 is accessed by the customer by pressing a prominently marked key or button to indicate the beginning of a purchase transaction. The message screen 202 asks the customer to identify the location for which the purchase is to be made by either inserting a previously purchased card 300 for that location, or by entering the location account number on the 10-key numeric pad provided 203. If the number entered is not a valid number, the customer will be so advised by a message on the screen 202. If the number is valid, the location address for that account will be shown on the message screen 202, and the customer will be asked to verify that this is the location for which he wants to purchase a card 300 by pressing the indicated button, or to otherwise abort the process by pressing the cancel button. When the "proceed" button is pressed, the message screen 202 will instruct the customer to insert one or more paper currency bills into the currency recognizer slot 204, and to press the indicated button when all the currency for this transaction has been inserted. As each currency bill is inserted, its denomination is read and stated on the message screen 202 for the customer to verify. When the full amount of currency for the transaction has been inserted, the customer instructs the CPU 201 to encode the data string to be written to the mag-stripe card 300, and present it at the write head of the encoder 205. When the data has been written to the card 300 and verified, the printer 206 produces a printed receipt for the customer, with a printed copy remaining in the encoded machine 200 for later audit by the on-site administrator.

For bilingual communities, the unattended encoder 200 will present the customer the option of having the instruction on the message screen 202 presented in an alternate language, such as Spanish or French.

The encoding machine 200 is accessed by the on-site administrator by means of a conventional metal key. The key allows access to the interior of the encoding machine 200 so that the cash may be removed, the receipt tape removed and/or replaced, and the card supply replenished. This key also allows access to a second "administrative menu" which the on-site administrator uses to read various values regarding status and transactions at the encoding machine 200. The on-site administrator is not necessarily an employee of the utility company, but more likely a contracted agent such as an apartment manager or the manager of a 24-hour market. The on-site administrator operates the encoding machine 200 as a cash drawer, removing the money periodically and depositing it in his/her own business bank account. The utility receives its payment in the form of a pre-authorized bank draft against the on-site administrator's bank account. The draft is automatically printed by the host processor on a daily (or other periodic) basis at the time the report of sales is received from the encoding machine 200.

Figure 3:
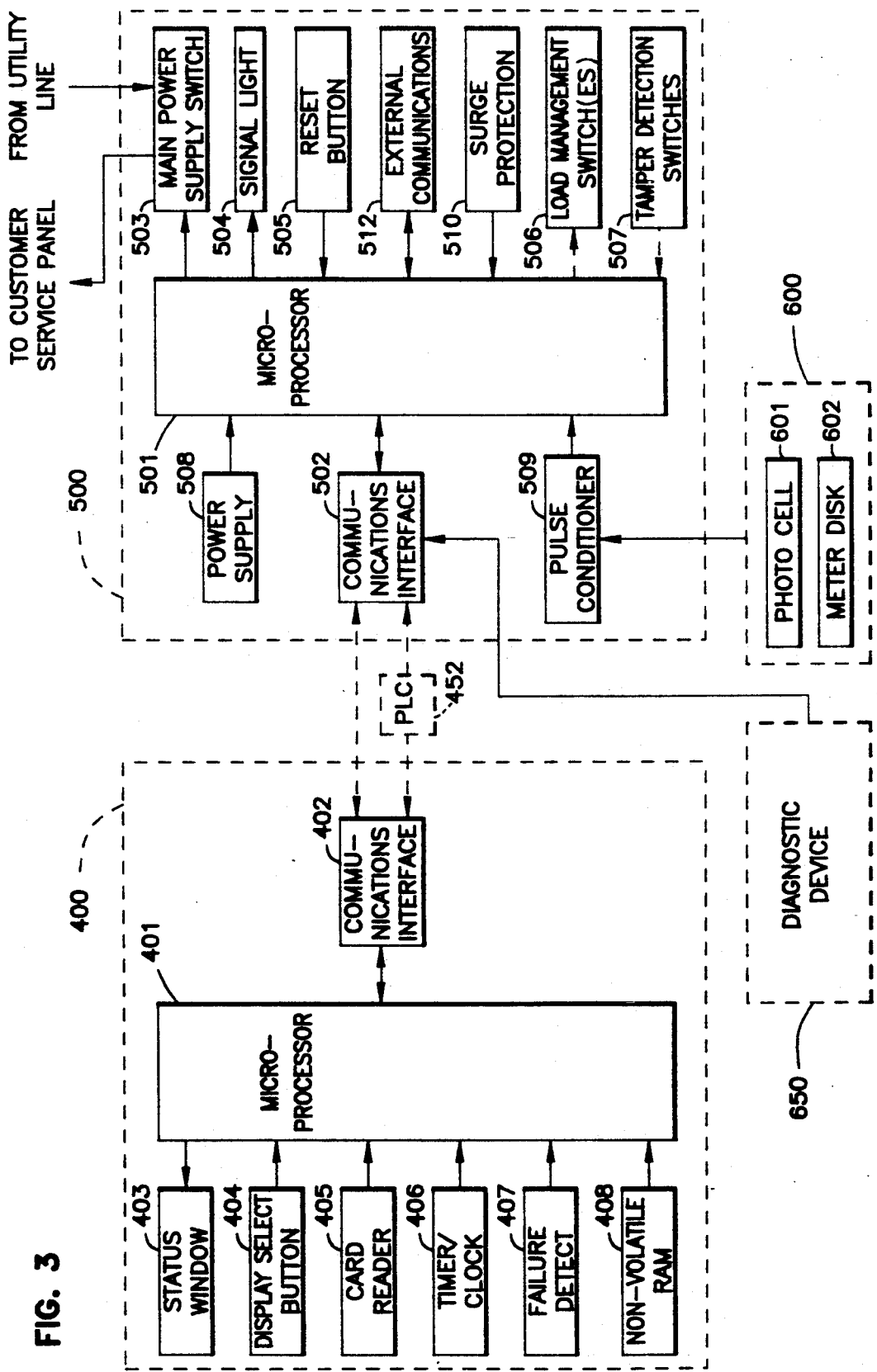
FIG. 3 is a block diagram of the control electronics located at the customer premises for accepting the prepayment mag-stripe cards and controlling the utility supply to the customer equipment.

FIG. 3 is a block diagram of the customer premises equipment which consists of three components: an indoor display device 400, a control device 500, and a modified conventional meter 600. The functions of any two, or all three of the devices may optionally be combined in a single housing where an indoor location is not available or desirable, and/or it is more economical to do so. The indoor display 400 and the control device 500 each have a microcontroller 401 and 501 and communications interface 402 and 502, and are programmed to pass status and control messages between them. The microprocessors may be physically connected by wire, or communicate through a commercially available powerline carrier system 452 which has been suitably adapted. The external features of the indoor display 400 are a status window 403 to show selected numeric values, a push-button 404 for changing the numeric values to be viewed, and a swipe-type mag-stripe card reader 405 to receive information regarding purchases which have been encoded on the mag-stripe card 300. Important internal features include a clock 406 for measuring time, power failure detection 407 to sense and react immediately to a loss of power, and non-volatile memory 408 to maintain essential data through extended power failures.

The major components of the control sleeve are a main power supply switch 503 to disconnect power when instructed by the programmed microcontrollers 401 and 501, a status signal light 504 to provide external indication of low supply or power off condition, and power reset button 505 to provide temporary power to the indoor display 400 so that mag-stripe cards may be read if the main power switch 503 has been opened. This is required if the powerline carrier communications 402 and 502 is being used in lieu of direct wiring between microcontrollers 401 and 501. An optional external communications port 505 is provided where it is desired to download stored data to an interrogation device, or reprogram an internal calendar clock chip. One or more optional load management switches 506 are provided to control selected branch circuit loads when certain programmed conditions exist; and one or more optional meter tampering detection switches 507 are provided to sense and record selected meter tampering events. A low voltage power supply transformer 508 provides power to operate both the indoor display 400 and the control sleeve 500, except when the powerline carrier communications options is used, the power supply transformer for the indoor display 400 is located in the powerline carrier module 452. Pulse conditioner circuitry 509 monitors the on-off state of two pairs of photo cells 601 in the kWh meter 600 that are used to sense the rotation of the meter disk 602. The number of meter disc rotations counted are used to calculate energy consumption and the value to be removed from the Amount Remaining shown in the status window 403; and the time interval of each disc rotation is used to calculate the Present Use of energy shown in the status window.

Password Security

The sequential password described in the aforementioned prior art is effective for communicating directly between two devices, and is restricted to the next sequential message. Under that scheme, the authenticity of each message delivered to the remote metering site is validated by the sequential password, which changes following each transaction or transmission. The next valid sequential password is an encrypted code known only by the transmitting device and the receiving device. The sequential password is formed by the Accounting Computer 100 in the utility office building. The indoor display 400 contains an identical algorithm for decoding the sequential password and sensing its authenticity.

In the preferred embodiment, the same prior art is used for constructing the sequential passwords, but additional elements are incorporated to allow multiple communication paths between the Accounting Computer 100 in the utility office and the remote indoor display 400 located at the customer site. Theoretically, there is no limit to the number of paths allowed, as provided by the number of card encoding stations the utility company determines are necessary to geographically cover their service territory. As a practical matter, the number of communications paths allowed is limited by the amount of internal memory made available in the customer display device 400. In the preferred embodiment, the available memory provided in display 400 allows seven different card encoding stations 101 and 200 to be active between the Accounting Computer 100 and the customer display 400. This will allow the utility customer to purchase electricity at seven different geographic locations. The construction of the password also allows for the purchase of more than one properly encoded card 300 per day from each of these seven encoding machines 200. The number of purchases provided per encoding machine 200 per day is limited by the data memory provided. In the preferred embodiment, two cards per day per encoding machine 200 are allowed.

For card encoding machines 101 which are operated in person by a cashier or clerk, the process for receiving payment and encrypting cards 300 is substantially the same as described in the prior art. Therefore, this discussion will be confined to a description of the operation of the unattended encoding machines 200. Two-way communications between the Accounting Computer 100 and the unattended encoding machines 200 is provided by an exchange of data diskettes or by commercial telephone lines, accessed for brief periods by commercially available modems 107 and 207 incorporated into the Accounting Computer 100 and the encoding machines 200. As each new customer display device 400 is installed at the customer site, the device is provided with its identifying numbers by a specially encoded initialization encoding card 300, and the new account information is transmitted to all of the encoding machines 200 within a proximate geographical area determined by the utility company. The elements of this New Account Record transmitted to the encoding machines 200 are shown in FIG. 4, including Account Number 109, Street Or Apartment Address 701, Communications Protocols To Be Used 702, Applicable Electric Rates 703, and Password Root 704. This information is stored in a Location Record (shown in FIG. 7) in the encoding machine 200 and used at the time a card 300 purchase is made.

When the customer purchases a card 300 from the encoding machine 200, the message encoded on the card will consist of the elements in FIG. 5, including Date Of Next Rate Change 705, Date Of Termination Of Cold Weather Protection 706, Maximum Electrical Load Allowed Under Cold Weather Protection 707, Communications Protocols 708, Account Number 709, Applicable Rates 710 (whether present or future), Password Root 711, Password Suffix 712, Amount Of Purchase 713, and Today's Date 714. The first seven elements 705-711 of this message are retrieved from the Location Record (shown in FIG. 7) in the encoding machine 200, this information having been provided by the Accounting Computer 100 at the time of the last database update. The last three items 712-714 are encoded by the machine 200 at the time of each purchase and added to the data string written to the purchase card 300. The Password Suffix 712 is the encoding machine 200 identification number; the Amount Of Purchase 713 is based upon the amount of currency received from the Customer; Today's Date 714 is the cumulative number of days counted since the system's "birthday," set as Jan. 1, 1987. (Where a calendar clock chip is not available in the display device, this "days since birthday" system is used for all date purposes).

The currency is inserted in a slot where it is captured and read by a commercially available currency recognizing device 204, which is an integral part of encoding machine 200. The customer identifies the location for which the purchase is being made by means of a numerical keypad 203, which is an integral part of the machine 200, or by inserting a card 300 previously used for the same location into the card reader 205. When a location number is entered, or the previous card is read, the encoding machine 200 displays electronically on the message screen 202 the address associated with the location number entered by the customer. This is to allow the customer to verify that the ensuing purchase will be for the correct location before currency is inserted into the currency recognizer 204. The message screen 202 displays the denomination of each bill inserted, and the total cumulative amount inserted. When the full amount of currency has been inserted, the customer presses the appropriate button to notify the machine 200 to proceed to encode the card 300.

Typically, once each day the Accounting Computer 100 will automatically dial up each encoding machine 200 and request a report of the card purchase transactions which have occurred since the last interrogation. If telephone communication is not available or practical, the information may be communicated by a transfer of data diskettes on a time schedule set by the utility company. Each transaction will be reported in a separate Transaction Record message with the elements of FIG. 6, including Account Number 715, Password Root Used 716, Password Suffix Used 717, Amount Of Purchase 718, Date And Time Of The Transaction 719, and Batch Number 720.

If there has been more than one transaction at the machine 200 for a single account location, the transactions will be reported in chronological order. Following the reports from all encoding machines 200, the Accounting Computer 100 will update the utility company's database and communicate back to the machines 200 the elements necessary to make valid the next transaction. When a purchase is made at an encoding machine 200, the update message transmitted back from the Accounting Computer 100 will be sent only to the machine 200 which performed the transaction, not to the other encoding machines in the network. The reason for this is that the only change in the data in the Location Record (shown in FIG. 7) of the encoding machine 200 for that account location is the password root, and each machine 200 will be operating on its own separate password series for each account location, as described in more detail below. However, if there is a change in location status which affects rates or protocols, those messages will be sent to all the encoding machines 200 to update that account information in the Location File (shown in FIG. 7) of each encoding machine 200 in the network. When there is a general increase in the rates charged by the utility company, the Accounting Computer 100 will send the appropriate messages to all encoding machines 200 for all customer accounts.

Each encoding machine 200 will maintain in its database a record for each active account it might reasonably be expected to support, based upon geographic location, as determined by the utility company Each Location Record comprises the fields of FIG. 7, including Account (Location) Number 721, Street Number And Name Or Apartment Number 722, Communications Protocols 723, Applicable Rates 724, Password 1 Root 725, and Password 2 Root 76. If it is desired to have more than two cards per day available from a single machine, additional Password Roots (3, 4, etc.) may be provided. Generally, a purchase transaction will result only in a change in the Password Roots.

Each encoding machine 200 will also maintain in its data base a record for each transaction. Transaction Records will be retained until reported to the Accounting Computer 100 each day, and then may be erased or retained for a specified number of additional days, at the option of the utility company. The elements in the Transaction Record are shown in FIG. 8, including Account Number 727, Password Root Used 728, Password Suffix 729, Amount Of Purchase 730, Date And Time Of Transaction 731, and Batch Number 732.

The password consists, in the preferred embodiment, of eight numeric characters, five of which are generated by the Accounting Computer 100, and three of which are affixed by the encoding machine 200. The first five characters are referred to as the root, and are changed for each transaction by means of the algorithm described in the prior art. In the preferred embodiment, upon initialization of an account, the Accounting Computer 100 generates two sequential password roots PWR1 and PWR2 for use in the first two card encoding transactions, and communicates this information to the geographically-appropriate encoding machines 200. When the Accounting Computer 100 subsequently receives the message from the first-used encoding machine 200 that the first card 300 has been encoded using the first password root PWR1, it will transmit back to the first-used machine 200 the next two password roots PWR2 and PWR3 which are to be used. If two card purchase transactions are reported for the same day from the same machine, the next two passwords transmitted back to the machine 200 would be PWR3 and PWR4. While the preferred embodiment makes available only two password roots per day, it is obvious that any number of additional password roots could be provided, limited only by the memory capacity of encoding machine 200 and customer location device 400.

When a card 300 is encoded by an encoding machine 200, it will expand the password by affixing to the root PWR1 the machine's identification number Ml to provide the complete password PWR1M1. If a second card is bought from the same machine 200 on the same day, the second complete password would be PWR2M1. When a customer location display device 400 is initialized, it will receive instructions from the Accounting Computer 100 to accept a password that includes only the root PWR1 but any suffix Mx. When the first transaction card 300 is used with suffix M1, the customer display 400 will assign a set of three internal registers for exclusive use by that encoding machine 200, and then calculate and store (or otherwise be programmed and compare) the next three passwords which will come from that machine 200, namely PWR2M1, PWR3M1, and PWR4M1. These password roots will be calculated using the same algorithm as the office computer, the algorithm having been assigned when the display device 400 received its initialization instructions from the Accounting Computer 100. The customer display 400 will then accept next any of three cards 300 which carries one of the three passwords it has internally stored. When a card 300 is used with any one of these passwords, the customer display 400 will generate and store the next following sequential password PWR5M1. Thus, the customer display 400 will perpetually have available three valid passwords for the first-used encoding machine 200. This allows the customer to purchase two cards 300 at one time and keep one as a reserve card, to be used at any time in the future without regard to the sequence in which the cards are used.

When the customer display 400 accepts the first card 300 from the first-used encoding machine 200 and assigns the 3-register password set for use by that machine, it retains the original root PWR1 so that in addition to that password set, the customer display 400 will accept a password PWR1Mx for any value of "x" except "1." This allows the customer to purchase a card 300 from a different encoding machine 200 than the one first use. When a purchase is made from a second encoding machine 200 not previously used by that customer, the complete password encoded on the card would be PWR1M2, which is the original root but with a different suffix. The customer location display 400 will recognize this password as being from a new and different encoding machine 200, and will thus open a second set of three registers, calculate, and store (or otherwise be programmed to calculate and compare) the next three passwords which would come from this second-used encoding machine 200. These passwords would be PWR2M2, PWR3M2, and PWR4M2. At this point, the customer display 400 would then have seven valid passwords stored, three from each of the two different encoding machines 200, and it would continue to accept PWR1Mx for any value of "x" now except "1" or "2." This same routine would be exercised whenever a card 300 was purchased from an encoding machine 200 not previously used. The number of different purchase points allowed in the preferred embodiment is seven, although the number could be more or less, depending upon the memory capacity allocated to this function in the customer location display device 400. When the capacity of the display device 400 has been reached and a purchase is attempted from still another encoding device 200, the customer will be advised that a purchase from that machine cannot be made unless the utility company makes a service call to clear and reset the display device 400.

Initialization of Display Device upon Installation

In the prior art, the procedure for installing the display device 400 at a new location involved loading certain identifying information, including the password scheme, into the device by means of an especially encoded mag-stripe card. The preferred embodiment utilizes the same technique, but with some additional information. In the preferred embodiment, the initialization card now carries the following data:
1. Password scheme initialization;
2. Display and sleeve communications address information;
3. Number of meters;
4. Readings of each meter at installation; and
5. Energy (Watt hours) per pulse of each installed meter.

Item 1 was included in the prior art. Items 2 through 5 are site-specific information which is not likely to change with time. Some of this site-specific information was originally included in the data encoded on the purchase cards 300 in the prior art, but has been shifted to the initialization card in the preferred embodiment in order to allow space in the purchase card date string for other information necessary for the enhanced functionality of the preferred embodiment.

Rate (Tariff) Changes

The Accounting Computer 100 contains operating software which includes a Rates File 109, and menu-selected CRT screen displays 201 which allow the utility company employee to store and code any number of rate structures for any number of customer classifications. Each customer location contained in the Location File 110 is assigned a rate designator code at the time of installation, based on the customer classification. When a purchase card 300 is encoded for any location, the rate information is included in the data string so as to instruct the customer display 400 the rate at which the energy used is to be subtracted from the Amount Remaining. When the rate values or rate structures change, it is desirable to automatically change the rates stored in the customer display 400 as close as possible to the time the utility company rate change goes into effect, regardless of the schedule on which the customer buys the cards 300. This is of particular concern where a customer may make a very large purchase just prior to a significant increase, in order to extend appreciably the period of time which he continues to use the service at the previous lower rate. Therefore, the data string encoded on the purchase card 300 contains fields for both the present and future rate, and the date the change is to be made. Where the rate structure is so complex that the data for both present and future rates cannot be encoded on a single card, the present rate data will be carried on the card until a "future" rate is entered into the Rates File 109, after which the future rate and data of change will appear on subsequent cards. The data will indicate whether the rate shown on the card is the "present" rate or a "future" rate. If a purchase card 300 is the first issued for a new location, it will always carry the present rate, and the future rate would not appear until the second card is issued for the location. The future rate information is placed in the Rates File 109 as soon as it is known. Where a calendar clock chip is not available in the display device 400, the date is specified by the cumulative number of days since an arbitrary beginning point, such as Jan. 1, 1987.

Retention of Data During Power Failures

It is necessary to retain all data regarding status and values in the display device 400 throughout all power interruptions, regardless of duration. This is done without the use of external batteries which have to eventually be replaced, and in the preferred embodiment is accomplished by the use of EEPROM technology within the microprocessor. In order to maintain the day "count" following an extended power outage, the date of each purchase is encoded on each purchase card 300, and this date is compared with the internal date shown by the display device 400. If the date of the card is earlier than the internal date, the internal date is changed to the date of the card. This is not as precise as a calendar clock chip, and is not suitable for precisely-timed functions such as "time-of-day rates," but is quite suitable for effecting rate changes, and is more accurate than pro-rating procedures used with present utility billing procedures.

Interactive Internal Diagnostics

The prior art cited earlier provides for certain malfunction messages to be displayed in the status window 403 of the customer display device 400 regarding errors in reading encoded cards 300. The preferred embodiment extends the interactive internal diagnostic capability to areas beyond card-reading errors. There are two categories of additional information provided. (1) Certain abnormal states are presented as error messages in the status window 403, and are of such importance as to override and exclude other normal display functions until they have been investigated and corrected. (2) Other information is simply stored internally and can be examined by calling up a separate series of status displays. The diagnostic displays can be called up by either the customer or utility serviceman by depressing and holding down for a short period (e.g., 5 seconds) the select button 404 on the face of the indoor display device 400. This action instructs the microprocessor 401 to cycle through and display in the status window 403 each value of the diagnostic series as the button 404 is repeatedly depressed. The operator can return to the normal display values by again holding down the select button 404; otherwise, the microprocessor 401 will automatically return to the normal display set after a pre-set period of time, typically 4 minutes.

The abnormal events or conditions that require prompt attention will alert the customer by displaying a numbered "error message" in the status window 403. In the prior art, errors that relate to improper reading of cards 300 are numbered 1 through 6. In this invention, additional numbers are assigned to identify other specific events or conditions, such as a dead photocell in the disk-rotation sensor 601, surge protection 510 breached, or other component or memory failures; or the fact that the meter 600 or control sleeve 500 have been subjected to one or more tampering efforts. For example, "Err 11" may be used to announce the failure of a photocell, and "Err 20" to indicate the meter was removed by an unauthorized person. Component failure events are announced immediately. Tamper event messages will not necessarily relate the error message to his tampering activity. When any of these abnormal-event error messages appear in the status window 403, all other displays are inhibited and will not respond to the select button interrupts. This is to increase the likelihood that the customer will call the utility company office and report a malfunction and permit the utility company to investigate and correct the abnormal condition. The specific abnormal-event messages available in the preferred embodiment will vary, depending upon the options selected. For example, in display devices 400 equipped with a calendar clock chip, one message would be "probably loss of correct time." Since the meter tamper detection switches are an optional item, where they are not available, such messages as "meter removed," "magnetic field present", or "slowed or stopped disk" will not appear.

In the preferred embodiment, the diagnostic series of messages may also vary with hardware options included with the indoor display 400 and control sleeve 500. The basic set of diagnostic values include:

1. Cumulative kWh. This number should match the kWh on the mechanical register of the kWh meter 600. The software program in the Accounting Computer 100 provides for adjusting this value to match any new reading in the event the kWh meter 600 is replaced with one having a different reading on its mechanical register.

2. Account Location Number. This is to confirm that the printed number affixed to the display housing 400 is the same as the one installed in the microprocessor 401 when it was initialized.

3. Transaction number. This shows how many purchase transactions have been executed by the microprocessor 401.

4. Number of meters attached to this display unit. (In the preferred embodiment, this would be up to 3. This is to allow sub-metered appliances such as electric water heaters which are served different promotional rates to be monitored through a single display unit).

5. Meter Number. This is to distinguish between meter signals when more than one meter is attached to a single unit.

6. Energy per Pulse. This is the watt hours represented by each pulse generated by the disk rotation.

Low Supply Warning

In the prior art cited above, provision has been made to alert the occupant that the power supply is low by blinking the numbers in the status window 403 and providing a brief audible tone once each hour by means of the speaker 409. In the preferred embodiment, provision is made to suppress the audible signal for a period of time at the discretion of the customer. This suppression is accomplished by automatically and routinely inhibiting the audible tone warning for a pre-set period of time (e.g., 8 hours) following any time the select button 404 is depressed.

"Word Messages"

In the prior art cited above, low supply was indicated only by the blinking display and periodic audible chirp of the display device 400, and various error conditions were indicated by the letter "E" followed by a number. The preferred embodiment expands this interaction with the customer to include certain English language "word" messages to be presented or alternately flash in the display window to make the condition more clear to the customers. For example, when the amount remaining is less than four days' supply, the blinking display alternately shows the word "buy" and the amount remaining. The preferred embodiment also includes French and Spanish equivalents of the English word messages. The language presented in the status window 403 is determined by bit settings in the data stream on the mag-stripe card 300. In countries where other languages are in common use, non-verbal signals are used to indicate the status or condition. In the preferred embodiment these messages are limited to those letters which can be created from 7-segment displays, but it is obvious that other messages or icons could be presented if more sophisticated and more costly displays were used.

Landlord Alert Signal

A status light 504 is installed in the housing of the control sleeve 500 to provide a visual indication to a landlord of the status of the electric supply to the property, especially when it is unoccupied. This is to allow the landlord to monitor the status without having to go inside and read the status window 403 of the indoor display 400. The status light 504 will normally be off, but will blink repeatedly when the low-supply warning of the indoor display 400 is active, and will be continuously illuminated if the amount of supply remaining is zero or negative. The blinking operation of this exterior status light will be inhibited during the same periods that the indoor audible signal 409 is suppressed. Provision is also made to inhibit the operation of the exterior status light through software coding by the Accounting Computer 100, when the "exterior status light" field of the Location File 110 is coded "NO." This instruction will be carried on the "initialization card" 300, rather than the "purchase transaction card" 300. Typically rental property locations will be coded "YES" to allow the exterior status light 504 to operate, and owner-occupied property will be coded "NO" to inhibit operation.

Load Limiting

In the prior art cited above, the microprocessor 401 is programmed to open the power switch 503 to discontinue the utility service when the amount of pre-purchased supply reaches zero. The preferred embodiment expands the programmed instructions to allow the option of continuing utility service to any (or all) customers at a reduced level (limited load) when the display microprocessor 401 is so instructed. This limited load option is implemented by placing numerical values in two fields in the data string encoded on the mag-stripe transaction card 300, said values then being loaded into the designated registers of display microprocessor 401. Customers eligible for extended service for limited loads without full payment would be identified and approved by utility personnel, and appropriate values entered into designated fields of their Location File 110 through the Accounting Computer 100.

The value in the first field establishes the level of utility usage which will be allowed to continue as expressed in (for example) watts or amps, but calculated and encoded as the minimum number of seconds allowed per disk revolution. For example, a restriction of 5 amps at 240 volts is the equivalent of 1,200 watts; and with a meter with a Kh of 7.2 and a multiplier of 1, if the time period of a disk revolution is less than 21.6 seconds, the 5 amp allowable load is being exceeded and the power switch 503 will be instructed to open. The switch will remain open for a pre-set period of time (e.g., 4 minutes) to allow the customer time to turn off or disconnect the offending appliance(s). The power switch 503 will automatically re-close at the end of the pre-set period and restore utility service. If the time period of the next disk revolution is still shorter than the instructions allow, the switch 503 will open again for the pre-set period. Sampling of the load level may be integrated over multiple revolutions of the meter disk 602 if desired, such that the power stays on for one minute or more before being disconnected again because the load continues to exceed the established limit. This OFF-and-ON cycle will continue until the connected load is brought below the allowable limit. However, if the condition is not corrected after one hour, the cycle times will be extended to 12 minutes ON and 48 minutes OFF, or some similar ratio. This provision reduces the number of OFF/ON operations of the appliances in case no one is home to turn off thermostatically controlled appliances whose loads exceed the allowable limit.

The value in the second field of data encoded on the mag-stripe card 300 establishes the day beyond which the Lifeline function will no longer be allowed to operate. The Lifeline option is provided to allow utility companies to respond to regulatory commission rules regarding "no winter cut-off," therefore it is anticipated that this function will be activated only during certain portions of the year, and possibly only with certain qualifying customers. This "date of termination of cold weather protection" instruction allows the utility company to terminate the "limited load" provision at the end of the protected season, and also may be set for shorter periods throughout the winter season (e.g., 14 days, 30 days) in order to require the customer to respond to a need for some amount of payment at intervals shorter than a full winter season. The ability to specify the "load level" and "duration" for each customer at the time of each purchase allows the utility maximum flexibility in setting different standards for different customers, based upon the customers' unique utility requirements and their ability to pay.

In the prior art cited above, the Amount Remaining value remains fixed at zero when the pre-purchased supply is exhausted. However, with service being allowed to continue under the limited load provision described above, it is necessary to accumulate and display negative values for the Amount Remaining shown in the status window 403. When such negative values are present, they are subtracted from the value of the next purchase transaction. In such cases, the status display 403 will show the Amount Purchased as it is encoded on the mag-stripe card 300, but the change in Amount Remaining will reflect only the difference between the amount purchased and the negative accumulation, and indeed, the Amount Remaining could still be negative if the amount of the purchase is not larger than the accumulated negative value. Since the end of the "protected season" is generally established by law or regulation, the Accounting Computer 100 is programmed such that in all cases it will encode the mag-stripe cards to terminate the Load Limiter privilege in the display microprocessor registers 401 at the end of the protected season. This is accomplished by setting a "default" termination date that is encoded on the purchase cards 300 unless an earlier date is specified at the time of the transaction. For any customer carrying a negative balance in the Amount Remaining status window 403 at the end of the protected season, the power switch 503 will open and remain open until the customer makes a purchase of sufficient value to bring the Amount Remaining into a positive balance.

When the customer's Amount Remaining value has run to zero and he is operating under limited load conditions, two additional values become available in the status window 403. One shows the present electrical load in watts so the customer can see his present use in relation to his allowed limit. If the service is interrupted because the limit has been exceeded, the load level at time of disconnect remains present in the status window 403. The other status display available under limited load conditions is the number of days remaining before the lifeline protection ends and the service is totally cut off.

Negative Accumulation of Fixed Charges

For most customer locations, when a property is temporarily vacant and the utility service is not connected, no collections are made for either energy used or for customer-related monthly fixed charges. In the prior art cited above, if a property is vacant but there is a positive balance in the Amount Remaining shown in the status window 403, energy may continue to be used and the monthly customer-related fixed charge continues to be subtracted on a pro-rated daily basis. If the property remains vacant until the Amount Remaining reaches zero, the power switch 503 opens, in which case there is no further use of energy, and no further fixed-charge draw is accumulated against the Amount Remaining. However, the preferred embodiment provides an option for the utility company to continue the fixed-charge draw and to show a negative accumulation for specified accounts. This is for use at those customer locations where fixed charges presently continue to accrue and be collected, such as seasonal cabins or other intermittently-used facilities. The Accounting Computer 100 and Location File 110 provide a field to specify whether negative accumulation of the fixed charge is to be exercised. This information is communicated to the customer location on the initialization card 300, not on a regular purchase transaction card 300. In this special case, if the Amount Remaining reaches zero, the microprocessor 401 program code instructs the power switch 503 to open, terminating service to the location, but the monthly fixed charge will continue to accumulate on a daily pro-rated basis and show a negative Amount Remaining in the status display 403. When the customer wishes to restore utility service to such a location, it is necessary to purchase a transaction card 300 of value greater than the accumulated negative amount shown in the status window 403.

Statistical Reporting of Energy Use

Electric utility companies typically read customer meters every working day of the month and produce reports of kilowatt hour sales based on these meter readings. Generally, these sales reports attribute kWh usage to the month in which the meter is read, without any effort to apportion the usage to the calendar months in which it was actually used. Such traditional reporting methods are accepted as being statistically acceptable, primarily because of the expense and difficulty associated with alternative methods. The only time that utilities normally attempt to prorate consumption for a meter reading period is when it bridges the date of a rate change, or at the end of the fiscal year when it is required to estimate unbilled revenue for accounting purposes.

Prepayment for utility service creates some new and different challenges in statistical reporting which are addressed in the preferred embodiment. While the actual charging for utility services used s accomplished very precisely with the display 400 and sleeve 500 mechanisms and instruction sets, even with complex multiple-step rates, the reporting of electric consumption is somewhat less precise since it must necessarily be based on statistical averages. Even so, it is no less precise than present procedures used with monthly meter readings and billings. Prepayment reporting is accomplished in the preferred embodiment by instructions programmed into the Accounting Computer 100 as described below.

The Transaction File 111 maintains a record of each transaction for each customer account, with information in as many as 55 different fields for each transaction, depending upon the complexity of the rate structure. These fields include such factual values as account number, customer name, date, amount tendered, days since last purchase, transaction number, amounts allocated to various taxes, password used, encoding machine used, and various rate values. There are also a number of calculated values which are derived and stored. These related to the kilowatt hours bought and the kilowatt hours used. The kWh bought value is a mathematical calculation based on the days since the previous purchase and the amount paid at present transaction. It is the less accurate value, and is provided for use in satisfying certain accounting functions.

The kWh used value is a mathematical calculation based on the days since the last purchase and the amount paid at the previous transaction. The mathematical calculation is complex and includes the following steps:

1. If a rate change occurred between the previous transaction and the present transaction, the amount tendered at the previous transaction is prorated, based on the number of subsequent days the old rate was in effect and the number of subsequent days the new rate was in effect. For example:

| | |
|---|---|
| if $x$ = old rate | $a$ = days old rate in effect |
| $y$ = new rate | $b$ = days new rate in effect |
| then $ax/(ax + by)$ = | percentage of payment allocated to old rate |
| $by/(ax + by)$ = | percentage of payment allocated to new rate |

2. For each allocated payment value, the applicable rate structures and taxes are used to determine the number of kilowatt hours which would have been used over the specified time period to produce a prorated bill equivalent to the allocated payment value. For example:

| | |
|---|---|
| if $3.00 | = monthly fixed charge |
| 0.10 | = cost per kWh for first 300 kWh/month |
| 0.075 | = cost per kWh for over 300 kWh/month |
| 24 | = days since previous transaction |
| 40.00 | = amount of previous purchase |

First subtract the prorated monthly fixed charge of $2.40 (24/30*3.00), leaving a net energy payment of $37.60. Then, for the 24-day period, 240 kWh (24/30*300) would be charged at the rate of .10 cents, at a cost of $24.00. The remaining amount of $13.60 ($40.00-$2.40-$24.00) would be divided by the rate of 7.5 cents per kWh to show 181 kWh was used at that rate. Thus the total kWh used for the 24-day period is 421 (240+181). The ayerage usage per day is 17.54 kWh (421/24), allocated as 10 kWh per day under the first rate block, and 7.54 kWh per day under the second block.

3. Having determined the average usage per day for the period, the Accounting Computer 100 determines the number of days in the 24-day period which fell into which calendar month, and stores those values for use in future reports. For example:

If the previous purchase occurred on Apr. 20, 10 days' usage would be allocated to Apr., and 14 days' usage would be allocated to May as follows:

|  | April | May |
| --- | --- | --- |
| First Block | 100 kWh | 140 kWh |
| Second Block | 75 kWh | 106 kWh |
| Total | 175 kWh | 246 kWh |

These totals are accumulated with totals from earlier and later transactions to produce total kWh usage reports for each calendar month of each year. All kWh values available in the reports also have a companion revenue value associated with each kWh block, also available for each report.

System Security

In addition to the password method provided to protect against counterfeit and fraud by customers of the utility company, the Accounting Computer 100 and its files 109, 110 and 111 are protected from fraudulent intervention by the employees of the utility company through the following methods:

There are three levels of user access to the system, each protected by operator specific passwords. Clerical operators have access to the customer transaction functions through the use of their own personal and unique passcodes. Supervisory operators have password access to a second level of functions, such as changing of rates. The system administrator has password access to a third level of functions including modification of user passwords, system configuration, and maintenance. In all cases, the date, time, and operator code associated with each and every transaction, regardless of its nature, is recorded in an audit record, such that all sales transactions and all changes made in an of the data bases can be traced to the date, time and operator who made the entry.

System Malfunctions, Diagnostics, and Reset

The housing for the Control Sleeve 500 is designed such that access can be gained to the Communications Interface 502 without removing the meter or disconnecting electric service to the location. This is accomplished by enclosing the electronics in a separate housing on top of the sleeve. By removing the meter sealing ring and pulling the top housing forward about one-quarter inch, it can be removed, providing access to the Communications Interface 502. A laptop PC 650 with a diagnostic program is connected into the system at this point such that all stored information can be read, and all functions of the system tested for proper operation. This diagnostic unit can be used to reprogram "initialization data," reset lost or scrambled data, clear and reset the password registers if they are full, or clear and reset the value when a customer is moving and requests a refund.

What is claimed is:

1. A prepaid utility dispensing system, comprising:
   (a) at least one card dispensing station comprising means for encoding a mag-stripe card with value and account information arising from a purchase of prepaid utility services, the value and account information comprising a present rate, at least one future rate and a date when the conversion to the future rates are to occur; and
   (b) a utility dispensing device resident at a customer site for dispensing utility services in accordance with the value and account information encoded on the mag-stripe card, wherein the present rate and the future rates determine how the utility dispensing device is to value the utility service dispensed, and the date determines when the future rates are to be placed into effect by the utility dispensing device, regardless of when the customer buys the mag-stripe cards.

2. The system as set forth in claim 1 above, wherein the utility dispensing device comprises means for comparing a date encoded on the mag-stripe card and a date stored by the utility dispensing device, and means for re-setting the date stored by the utility dispensing device when the date encoded on the mag-stripe card is a later date, so that a correct date may be maintained by the utility dispensing device following an extended power outage.

3. A prepaid utility dispensing system, comprising:
   (a) a utility dispensing device resident at a customer site for dispensing utility services in accordance with a value thereof as encoded on a mag-stripe card;
   (b) status window means, connected to the utility dispensing device, for displaying status and system control indications for the utility dispensing device; and
   (c) means for selecting among a plurality of languages to use for displaying the status and system control indications, the means for selecting comprising means for reading a mag-stripe card, for examining a parameter supplied by the mag-stripe card, and for choosing the language for the status window means in accordance with the parameter.

4. A prepaid utility dispensing system, comprising:
   (a) at least one card dispensing station comprising means for encoding a mag-stripe card with value and account information arising from a purchase of prepaid utility services, the value and account information comprising lifeline protection information indicating a maximum load level and a termination date; and
   (b) a utility dispensing device resident at a customer site for dispensing utility services in accordance with the value and account information encoded on the mag-stripe card, wherein the maximum load level determines the rate of utility consumption the utility dispensing device is to allow when the prepaid utility services are depleted, and wherein the termination date determines when the lifeline protection is to be terminated unless the customer has made additional purchases of prepaid utility services.

5. The system as set forth in claim 4 above, wherein the minimal supply level comprises a minimum number of seconds allowed per disk revolution of the utility dispensing device, so that a power switch in the utility dispensing device is instructed to open when a time period for the disk revolution is less than the minimum number of seconds, thereby indicating that an allowable load is being exceeded.

6. The system as set forth in claim 5 above, wherein the utility dispensing device further comprises:
   means for keeping the power switch open for a predetermined period of time to allow the customer time to uncouple offending appliances from the utility service; and means for re-closing the power switch at the end of the predetermined period to thereby restore utility services.

7. The system as set forth in claim 4 above, wherein the card dispensing station further comprises means for specifying a maximum load level and a termination date for each customer, thereby allowing for maximum flexibility in setting different standards for different customers, based upon the customers' unique requirements and their ability to pay.

8. The system as set forth in claim 4 above, wherein the utility dispensing device further comprises means for accumulating negative values for utility services dispensed under the lifeline information, so that the negative values are subtracted from the value of a next purchase of prepaid utility services.

* * * * *

UNITED STATES PATENT AND TRADEMARK OFFICE
CERTIFICATE OF CORRECTION

PATENT NO. : 5,146,067
DATED : September 8, 1992
INVENTOR(S) : Joseph W. Sloan et al.

It is certified that error appears in the above-identified patent and that said Letters Patent is hereby corrected as shown below:

On the title page, Item [75]: Inventor, "Mark C. Day" should read --Mark E. Day-- and "Michael Jarreau" should read --Michael P. Jarreau-- Column 3, line 36, after "meter", "500" should read --600--. Column 5, line 41, "101" should read --100--. Column 10, line 16, "76" should read --726--. Column 18, line 55, after "of" and before "10", strike the period ("."). Column 19, line 36, after "in" and before "of", "an" should read --any--. Column 22, line 1, after "unique" insert --utility--.

Signed and Sealed this

Twelfth Day of October, 1993

Attest:

BRUCE LEHMAN

Attesting Officer     Commissioner of Patents and Trademarks